United States Patent [19]

Colibert

[11] Patent Number: 5,725,234
[45] Date of Patent: Mar. 10, 1998

[54] BALL-TYPE COUPLER FOR TRAILERS AND THE LIKE

[76] Inventor: Floyd A. Colibert, 2995 W. 6220 South, West Jordan, Utah 84084

[21] Appl. No.: 547,387

[22] Filed: Oct. 24, 1995

[51] Int. Cl.$^6$ ............................................. B60D 1/06
[52] U.S. Cl. ............................. 280/512; 280/508
[58] Field of Search ............................. 280/504, 508, 280/509, 511, 512, 513, 901

[56] References Cited

U.S. PATENT DOCUMENTS

| | | | |
|---|---|---|---|
| 2,099,549 | 11/1937 | Watson | 280/511 |
| 2,824,754 | 2/1958 | Bolmes et al. | 280/512 |
| 3,049,366 | 8/1962 | Peters | 280/512 |
| 3,446,520 | 5/1969 | Gibson et al. | 280/512 |
| 3,831,982 | 8/1974 | Bernhardt et al. | 280/511 |
| 4,008,906 | 2/1977 | Schafer et al. | 280/511 |
| 4,416,466 | 11/1983 | Park | 280/511 |
| 4,699,395 | 10/1987 | Hale | 280/512 |
| 4,993,739 | 2/1991 | Putnam | 280/511 |
| 5,000,474 | 3/1991 | Kristensen | 280/511 |
| 5,080,386 | 1/1992 | Lazar | 280/511 |

FOREIGN PATENT DOCUMENTS

| | | | |
|---|---|---|---|
| 2690109 | 10/1993 | France | 280/511 |
| 774693 | 2/1956 | United Kingdom | 280/511 |
| 93/14948 | 8/1993 | WIPO | 280/511 |

*Primary Examiner*—Kevin Hurley
*Attorney, Agent, or Firm*—Thorpe, North & Western

[57] ABSTRACT

A ball-type coupler is disclosed for attaching a trailer to a ball. The coupler includes a housing having an inner wall defining a void formed therein with a generally hemispherical end for receiving a ball. One or more elongate rotatable rods are disposed through the housing so that distal and proximal portions of the rods are disposed at least partially within the housing, and so that a portion of the rotatable rods are disposed so as to intersect and selectively extend into the void. The rotatable rods have a noncylindrical section, typically a curvature formed therein, such that when the rotatable rods are rotated about their central axis of rotation into a first position, the exterior surface of the rods align with the curvatures of the inner wall so as to enable a ball to be slid into the void past the rotatable rods. Once the ball is disposed adjacent the hemispherical end, the rotatable rods are rotated to a second position wherein the exterior surface of the rotatable rod is not aligned with the wall of the housing and extends into the housing at a position adjacent the lower curvature of the ball to prevent withdrawal of the ball from the housing. An actuator mechanism is also taught which moves the arms between the first and second positions. The actuator mechanism ensures that the rods stay in the proper position during use.

24 Claims, 7 Drawing Sheets

BALL-TYPE COUPLER FOR TRAILERS AND THE LIKE

BACKGROUND OF THE INVENTION

The present invention relates to a coupler for trailers, and, in particular, to a ball-type coupler for goose and fifth wheel trailers which enables positioning of the ball within the coupler while the trailer is at any angle relative to the truck holding the ball, and which improves the attachment between the trailer and the ball. Specifically, the invention relates to such a coupler which simultaneously improves ease of use and safety.

There are a wide variety of ball-type couplers which are used to connect a truck to a trailer. A common arrangement is a generally spherical housing which is open along a bottom portion and a rear portion. The ball is positioned within the housing by sliding it upwardly through the open bottom and to a position in which the ball rests against the inside of the housing. A lever or other similar latching element which is disposed in the open rear portion is moved into a position adjacent the ball, to thereby prevent withdrawal of the ball through the opening in the bottom. This is achieved by the lever or other latching element being moved into the area adjacent the lower curvature of the ball. By locking the latching element in place, the ball is kept within the housing.

Such embodiments have several disadvantages. First, many such arrangements limit the angle at which the ball can be slid into the housing. This, in turn, limits the angle of the trailer may be in relative to the truck during coupling. Second, if the locking element were to fail, the ball could readily fall from the housing, thereby freeing the trailer from the control of the truck to which it is mounted.

Another embodiment includes a housing for receiving a ball which is mounted to a truck. The housing has a plurality of slits formed therein to allow a plurality of coupling cams to selectively rotate into a position in which a portion of the cam extends into a position below the lower curvature of the ball. The coupling cams prevent the ball from being pulled out of the housing.

The coupling cams are selectively rotated into position adjacent the lower curvature of the ball by moving a sleeve about the housing. The sleeve has recessed areas which allow the coupling cams to rotate away from the ball, thereby creating an open position in which the cams do not hold the ball within the housing. If the recessed areas are not aligned with the coupling cams, the cams are forced into a locking position in which they prevent the ball from being withdrawn.

Such an approach has several drawbacks. First, the coupling cams are not biased toward the ball. Thus, if the sleeve about the housing is not properly placed, the coupling cams can pull away from the ball and allow the ball to be withdrawn. Second, the sleeves often do not a device for preventing the sleeve from being left in such a position that the coupling cams can be rotated away from the housing. Thus, the ball may accidently pull out of the housing due to inadvertence on the part of the user.

Yet another concern is that the coupling cams are generally thin and may not hold the ball under high stress. Those skilled in the art will appreciate that ball-type couplers are often used with heavy loads. If the trailer breaks free from the truck when in an accident or similar situation, considerable harm can be done. Thus, it is important that the retention devices be able to withstand extreme stress.

Still another problem with such an attachment is that to lock the coupling cams in place, the sleeve disposed about the housing must be turned. However, the ball used for a fifth wheel or goose neck trailer is generally positioned in the middle of the bed of a truck. Thus, after the user has placed the housing over the ball, he or she must crawl up onto the bed and lock the sleeve into place so that the coupling cams are locked into place around the ball. When removing the trailer, a similar process must be followed.

Thus, there is a need for an improved ball-type coupler for goose neck and similar types of trailers. Such a coupler should securely hold the ball and should include a safety mechanism which prevents the coupling from inadvertently being left in an unlocked position. Such a coupling should also enable a user to open and close the coupler to release or grasp the ball without having to physically climb onto the bed of the truck pulling the trailer.

SUMMARY OF THE INVENTION

Thus, it is an object of the present invention to provide a ball-type coupler for goose neck and other trailers which securely holds a ball.

It is another object of the invention to provide such a coupler which includes a safety mechanism to prevent the coupler from being left in an unlocked position inadvertently to thereby maintain the ball within the housing of the coupler.

It is another object of the present invention to provide such a coupler with increased strength so as to more securely hold the ball.

It is still another object of the present invention to provide such a coupler which may be selectively removed from the trailer.

It is still yet another object of the present invention to provide a couple which may be open and closed from a remote location.

The above and other objects of the invention are realized in specific illustrated embodiments of a ball-type coupler for goose neck and other trailers including a housing having an inner wall defining a void formed therein with a generally hemispherical end for receiving a ball. One or more elongate rotatable rods are disposed through the housing so that distal and proximal portions of the rods are disposed at least partially within the housing, and so that a central portion of the rotatable rods are disposed so as to intersect and selectively extend into the void. The rotatable rods have a noncylindrical section, typically a curvature formed therein, such that when the rotatable rods are rotated about their central axis of rotation into a first position, the exterior surface of the rods align with the curvatures of the inner wall so as to enable a ball to be slid into the void past the rotatable rods. Once the ball is disposed adjacent the hemispherical end, the rotatable rods are rotated to a second position wherein the exterior surface of the rotatable rod is not aligned with the wall of the housing and extends into the housing at a position adjacent the lower curvature of the ball to prevent withdrawal of the ball from the housing.

In accordance with one aspect of the invention, two rotatable rods are disposed on opposing sides of the housing, and the two rotatable rods are activated by a common actuating mechanism to rotate the rods in unison between first and second positions.

In accordance with another aspect of the invention, the rotatable rods are connected to a safety mechanism which automatically turns the rotatable rods into the second, closed position if the actuating mechanism is released.

In accordance with still another aspect of the invention, the safety mechanism prevents the actuation mechanism from being accidentally opened once closed. Typically, the safety mechanism will have a specific direction in which the safety mechanism must be moved to activate the actuation mechanism. Such a direction will typically be one which is unlikely to occur in typical accidents, etc.

In accordance with still another aspect of the invention, the actuation mechanism can be activated from a remote position, such as from a position adjacent the manual or electric jack used to raise or lower the trailer. Thus, the user can open the coupler as it is lowered onto the ball disposed on the truck bed, or prior to removal of the same. Once the housing of the coupler is disposed about the ball, the actuation mechanism is released to lock the ball within the coupler.

In accordance with another aspect of the invention, the actuator mechanism includes a biasing/locking member which allows the actuator mechanism to move freely until there is a ball disposed in the void formed by the housing of the coupler. Once a ball is positioned in the void, the biasing/locking member limits movement of the actuator member until the user intentionally by passes the biasing/locking member.

In accordance with another aspect of the invention, the housing of the coupler is releasably attachable to the goose neck or other type trailer. The housing of the coupler is held to a pipe of the trailer by a pin or some other secure holding which may quickly be released, so that the user may remove the housing and prevent others from driving away with the trailer when it is parked.

Still another aspect of the invention is that the coupler may be quickly and easily disassembled for cleaning, or for inspection. The rotatable rods and the actuation means can be removed from the housing, inspected, and reassembled in the housing without the need for complex tools, etc.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
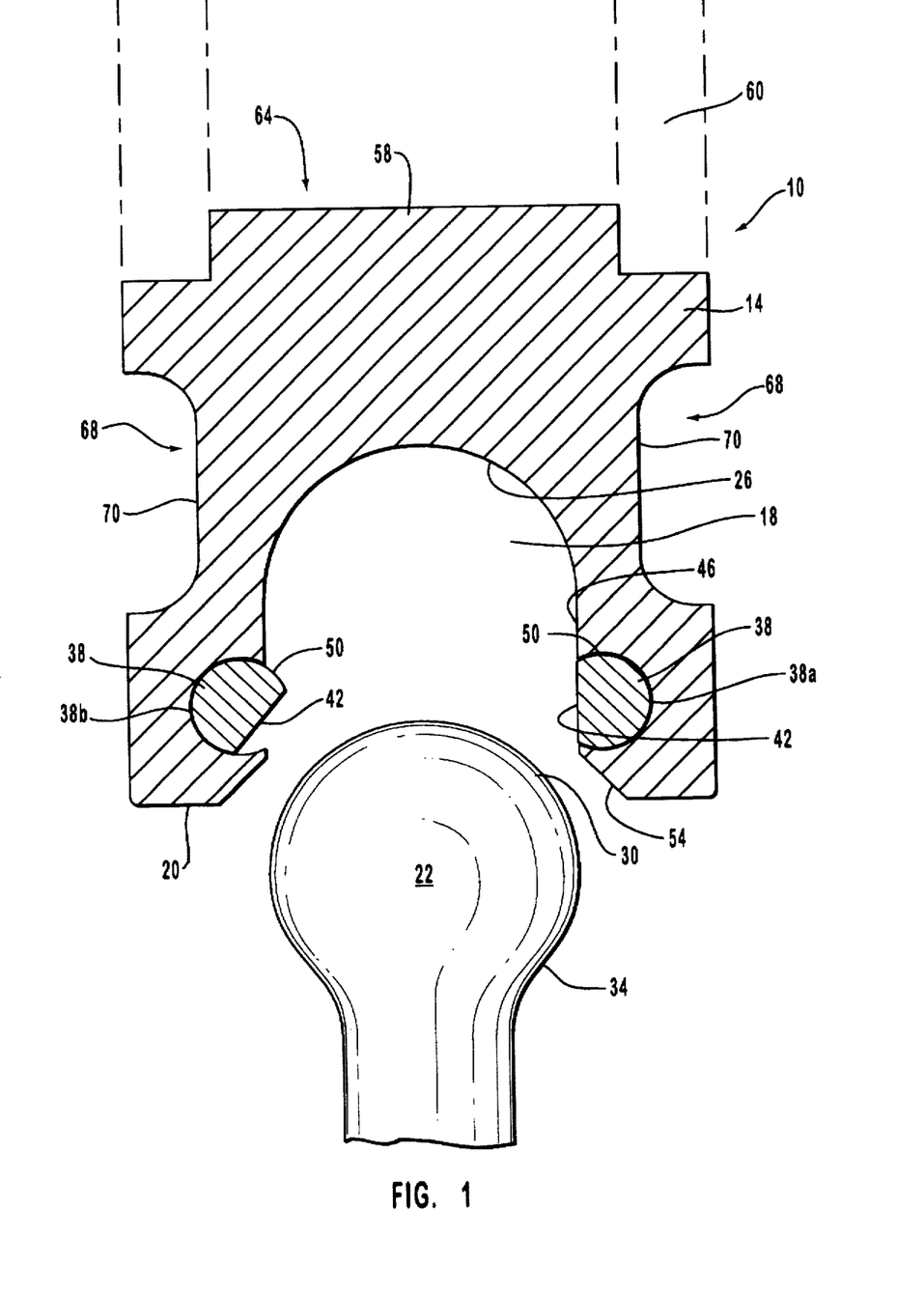
FIG. 1 shows a cross-sectional view of a coupler housing made in accordance with the principles of the present invention, and fragmented views of a ball and of a pipe of a goose neck trailer.

Referring to FIG. 1, there is shown a side, cross-sectional view of a ball-type coupler for goose neck and other trailers, generally indicated at 10, and made in accordance with the present invention. The coupler 10 includes a main housing 14 which is typically made of steel or some other very durable material. When formed from steel, the housing 14 is usually forged or cast.

The housing 14 has a void 18 formed therein to extend upwardly from a bottom end 20 of the housing. The void 18 is formed so that a conventional ball 22 will nest within the void with a small amount of clearance, typically a few thousandths of an inch. Preferentially, the void has a hemispherical end portion 26 which mates with the upper curvature 30 of the ball to minimize friction. Of course, the exact dimensions of the void 18 are dependant primarily on the size of ball 22 which is to be held by the coupler.

As with virtually all balls, the ball 22 shown in FIG. 1 includes a generally rounded lower curvature 34. It is by contacting this lower curvature 34 of the ball 22 that most trailer hitches keep the coupling mechanism in place. As was discussed in the background section, prior art attempts to hold the lower curvature have generally focused on having a latch or one or more cams extend into contact with the lower curvature 34.

In the present invention, the lower curvature 34 is not held in place by a latch or conventional cam. Rather, a pair of rotatable rods 38 are anchored in the housing 14, and are positioned so that a central, noncylindrical section of each of the rods extends out into the extremities of the circular void 18. The rotatable rods 38 each has a first and second surface, the first surface extending a lesser distance from a central axis of rotating than the second surface. Thus, as shown in FIG. 1, the first surface is formed of a curvature or indentation, shown in FIG. 1 as the straight portion 42) formed therein to match the curvature of the housing wall 46 defining the void 18 (seen best in FIG. 2). When the rods 38 are rotated into a first position in which the curvature 42 of the rods is aligned with the housing wall 46, such as is shown with rod 38a in FIG. 1, the ball 22 can be slid into the void 18. Once the ball 22 is positioned within the void 18 so that the lower curvature 34 is slightly beyond the rotatable rods 38, the rods are rotated into the position shown by rod 38b, with the second surface (shown as arcuate surface 50) of the rod intersecting the void 18. In such a position, an upper curvature of the rods is disposed against the lower curvature 34 of the ball 22. Thus, the ball 22 is held firmly within the void 18 of the housing 14.

The arrangement shown provides many advantages over those in the prior art. As will be discussed in detail below, this arrangement enables the ball 22 to be held securely in the void 18 even if the mechanism which turns the rotatable rods 38 comes loose, and even if one of the rods were to be removed from the housing. Additionally, because of the axis of rotation of the rotatable rods 38, extreme pressure on the ball 22 will not cause the rods to rotate into an open position, as will occur with the cams and latches of the prior art.

Those skilled in the art will appreciate that the design also allows for multidirectional hook-up. The cylindrical nature of the void 18 and the balanced nature of the rotatable rods 38 allows the ball 22 to be inserted regardless of the angular position of a truck and trailer being attached together by the coupler 10.

Yet another advantage of the present invention is that the rotatable rods 38 need not be fully in the first, open position (shown by rod 38a) to place the ball 22 in the void 18. If, for example, the rods 38 are in the second, closed position (shown by rod 38b) when the housing 14 is placed on the ball 22, the weight of the trailer or other attachment will force the rods to deflect the rods momentarily into the first position, unless the rods are firmly held in place. Thus, by allowing the rods to rotate, the ball is able to easily to enter the void 18. (The annular beveled portion 54 of the bottom end 20 of the housing 14 helps to channel the ball 22 into the void 18). As will be discussed in detail below, the rods 38 will then automatically reassume the second, closed position, whereby they hold the ball 22 in the void 18. Of course, a locking mechanism can be used to keep the rods 38 from deflecting when such is undesirable. However, such a convenient system will usually be desirable.

Also shown in FIG. 1 is an upper housing section 58 which is sized for adaptation to the pipe, indicated by dashed liners 60, of the goose neck or similar type of trailer. In the embodiment shown in FIG. 1, the upper housing section 58 is slid into an opening 64 in the pipe 60, and then the pipe is welded to the housing 14. Typical sizes for the pipes 60 are 3 inches, 3.5 inches and 4 inches. Thus, the outer diameter of the upper housing section 58 will be sized accordingly.

FIG. 1 further shows a concave portion, generally indicated at 68, in the outer wall 70 of the housing. The major functions of the concave portion 70 are to provide an aesthetically pleasing design for the housing, to reduce the weight of the housing 14, and to provide access to roll pins (discussed in FIG. 2) used to hold the rods 38 in place.

Figure 2:
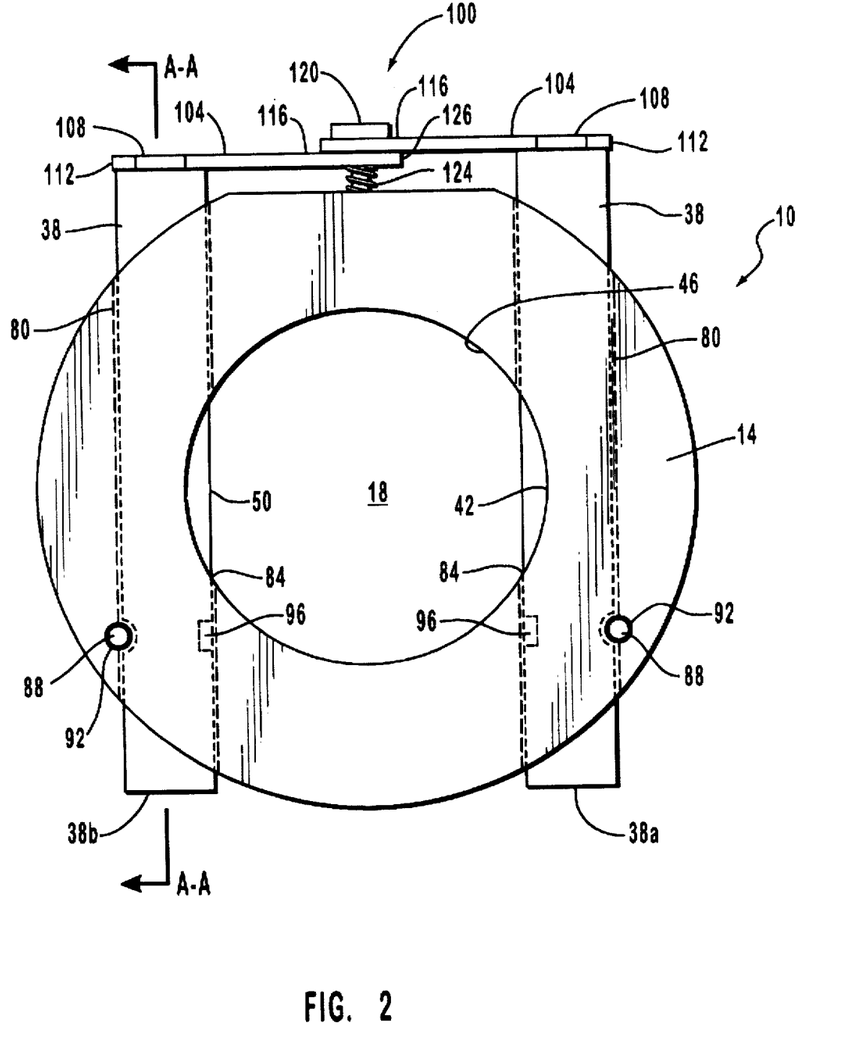
FIG. 2 shows a bottom perspective view of the housing shown in FIG. 1.

Referring now to FIG. 2, there is shown a bottom view of the housing 14 of the coupler 10 of the present invention. The view of FIG. 2 shows each of the rotatable rods 38 being positioned in first and second channels 80 which are each open at both ends thereof, so that the rods can extend therethrough. The open ends also allows the rods 38 to be quickly removed for cleaning or inspection, as will be discussed below.

The channels 80 also each have a central opening 84 which intersects the void 18 in the housing. When a rotatable rod 38 is positioned in one of the channels 80, a central portion of the rod intersects a portion of the void 18 as shown with the second, arcuate surface 50 of rod 38b. When the rods are rotated so that the curved portion 42 is aligned with the central opening 84 of the channel 80, as shows at rod 38a, the curved portion aligns with the annular inner wall 46 of the housing 14.

Also shown in the channels 80 are roll pins 88 which are inserted into a pair of bores 92, each of which is disposed perpendicular to one of the channels 80 and partially intersects the channel. The roll pins 88 extend into the channel 80 and into a groove 96 formed in each rotatable rod 38, to keep the rods within the channels 80 in the housing 14. If the roll pins 88 are removed, the rotatable rods 38 can be quickly and easily removed from the housing 14. To facilitate such removal, the bores 92 typically extend through the housing 14 so that the roll pins 88 can be tapped out an opposing side and removed with one's hand or with a pair of pliers if necessary.

Also shown in FIG. 2 is an actuator means, generally indicated at 100, which is used to rotate the rods 38 between the first, open position and the second, closed position. The actuator means 100 includes a pair of slotted control arms 104. Each slotted control arm 104 has a first end 108 which is fixedly attached to one end of the rotatable rods 38. Typically, the rotatable rods 38 have a small neck, shown by dashed lines 112, which extends into a hole (not shown) of the slotted control arms 104. The neck 112 is welded or otherwise fixed to the slotted control arms 104 so that the upward or downward movement of the slotted control arms causes rotational movement of the rotatable rods 38.

Each slotted control arm 104 has a second end 116, opposite the first end 108. Each second end 116 has a slot formed therein (shown in FIG. 3) which slide along a shoulder bolt 120. If the shoulder bolt 120 is moved upwardly, i.e. away from the view in FIG. 2, the slotted control arms 104 move from a generally horizontal position (FIG. 2) in which the arms are parallel or sloping slightly downwardly toward one another, to a position in which the arms extend downwardly from the shoulder bolt at an angle of about forty-five degrees. As the slotted control arms 104 move upwardly, the rotatable rods 38 rotate in the housing to align the curved portion 42 with the inner wall 46 of the housing 14. When the arms move back toward a position in which they are generally parallel, the rotatable rods rotate into the second, closed position.

If a user decides to disassemble the coupler 10 for cleaning or inspection, he or she need only remove the shoulder bolt 120 from a slidable locking bar (FIGS. 3A-4) into which it is threaded, and remove the roll pins 88 from the bores 92. Once the shoulder bolt 120 and roll pins 88 have been removed, the rotatable rods 38 can be removed by simply pulling on the slotted control arms 104 in a direction generally parallel with a longitudinal or central axis of rotation A—A of the rods.

Figure 3A:
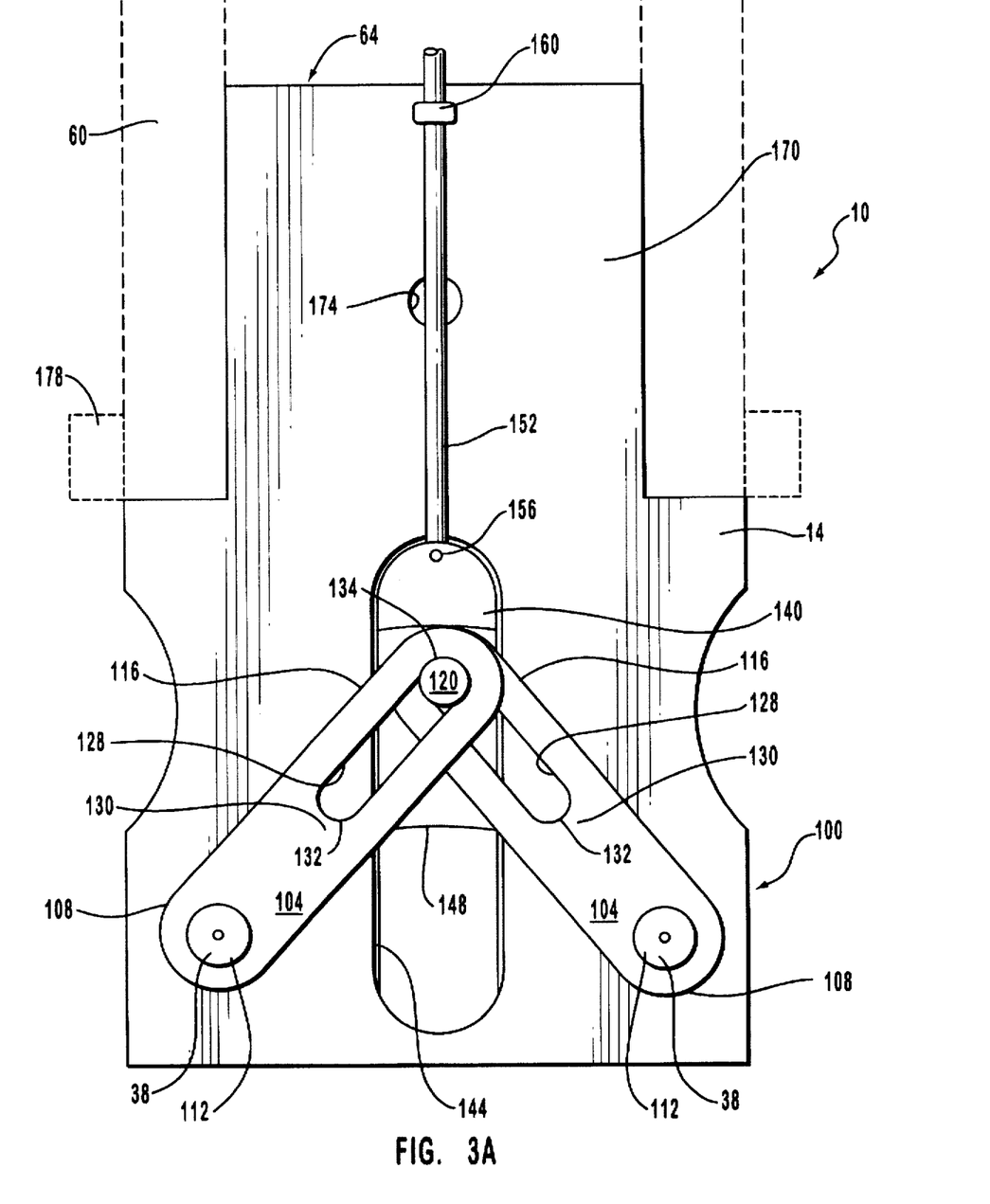
FIG. 3A shows a rear view of a housing made in accordance with the teachings of the present invention so as to show an actuator for opening and closing the coupler, the actuator being disposed in an open position.
Figure 3B:
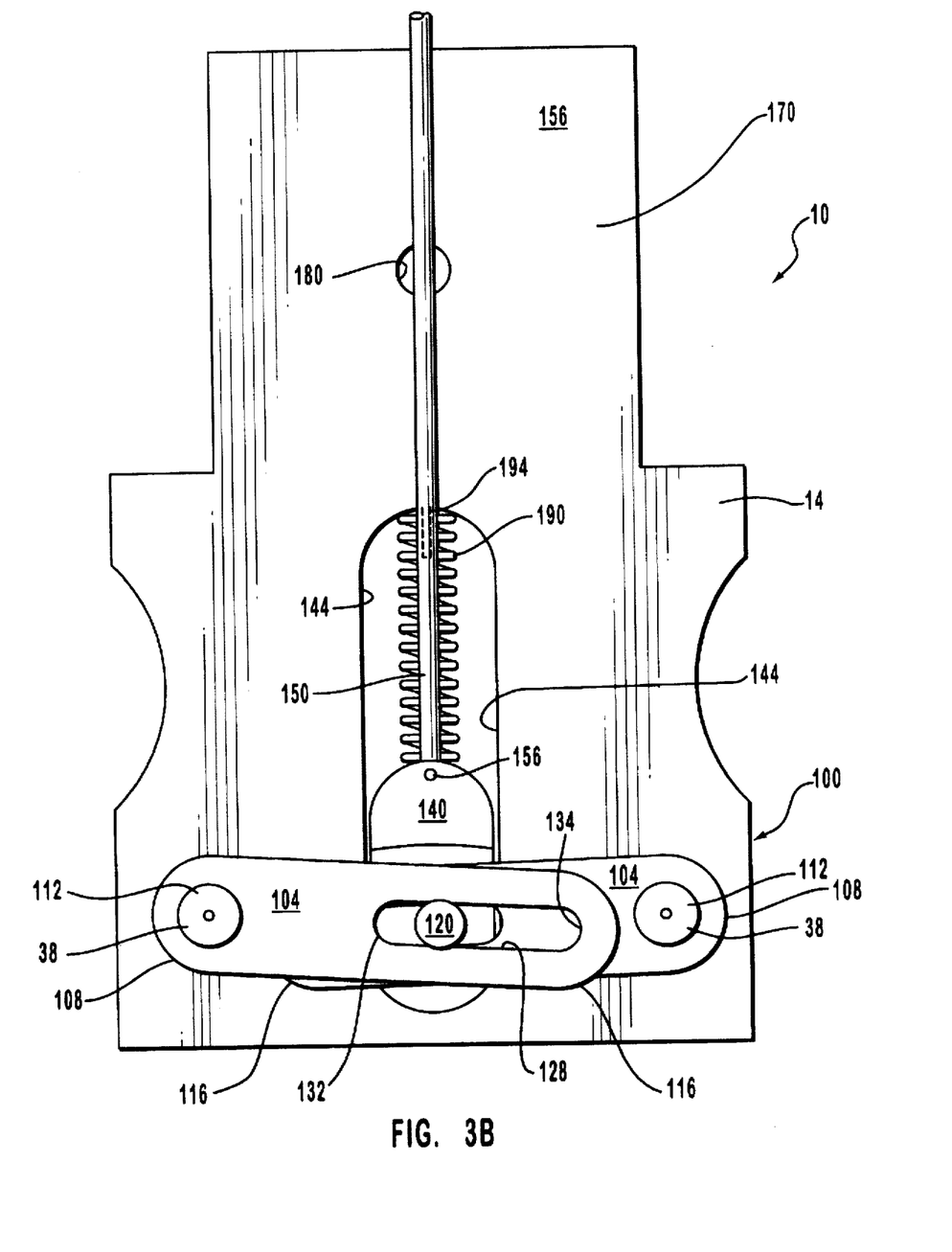
FIG. 3B shows a rear view similar to that of FIG. 3A, but with the actuator in a closed position.
Figure 4:
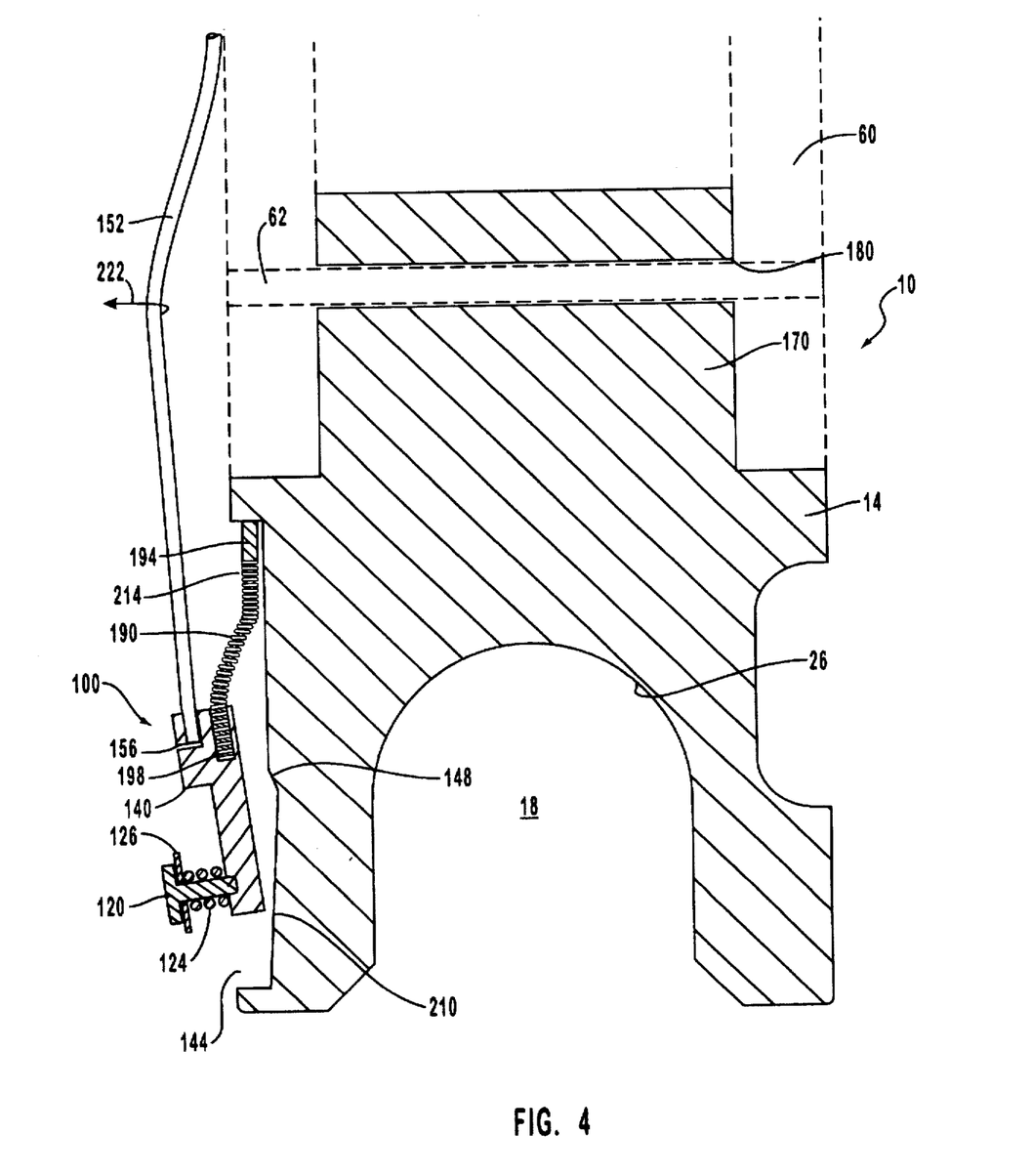
FIG. 4 shows a side, cross-sectional view of the housing taken through the actuator, the actuator being between a closed position and an open position.

Also shown in FIG. 2 is a spring 124 and a washer 126 which is disposed about the shoulder bolt 120 and positioned under the slotted control arms 104 and the slidable locking bar (FIGS. 3A-4). The washer 126 prevents the spring 124 from getting tangled in the control arms 104. The function of the spring 124 and washer 126 is discussed in detail with respect to FIG. 4.

Referring now to FIG. 3A, there is shown a perspective view of the actuator means 100, mounted on a housing 14. The actuator means 100 includes the slotted control arms 104, which are attached to the neck 112 of the rotatable rods 38 at the first end 108, and are which are slideably disposed about the shoulder bolt 120 at the opposing second end 116. The shoulder bolt 120 tracks in a slot 128 which is formed in each slotted control arm 104 and is disposed to extend from the second end 116 to a middle portion 130 of the arm. The shoulder bolt 120 is able to slide between first and second ends, 132 and 134, respectively, to thereby change the orientation of slotted control arms 104. The spring 126 (FIG. 2) helps to hold the slotted control arms 104 snugly against the head of the shoulder bolt (omitted in FIG. 3A).

Thus, as shown in FIG. 3A, the control arms 104 are disposed so as to slope upwardly toward each other as they extend from the rods 38 at an angle of about forty-five degrees. When the slotted control arms 104 are disposed at such an angle, the rotatable rods 38 to which they are attached will be rotated into the first, open position, such as is shown in FIGS. 1 and 2 by rotatable rod 38a. With the rotatable rods 38 in the first, open position, the user may place a ball (FIG. 1) within the housing 14 by simply moving the ball into the void 18 (FIGS. 1 and 2).

In order to move the slotted control arms 104 into the position shown in FIG. 3A wherein the rotatable rods 38 are in the first, open position, an upward force must be exerted on the shoulder bolt 120. This is accomplished by a slidable locking bar 140 to which the shoulder bolt 120 is attached. The slidable locking bar 140 slides generally vertically and in a linear direction within an elongate slidable locking bar groove 144 between a first position (shown in FIG. 3A) and a second position (shown in FIG. 3B). As it does so, the slotted control arms 104 move and cause the rotatable rods to move between the first, open position and the second, closed position.

Figure 5:
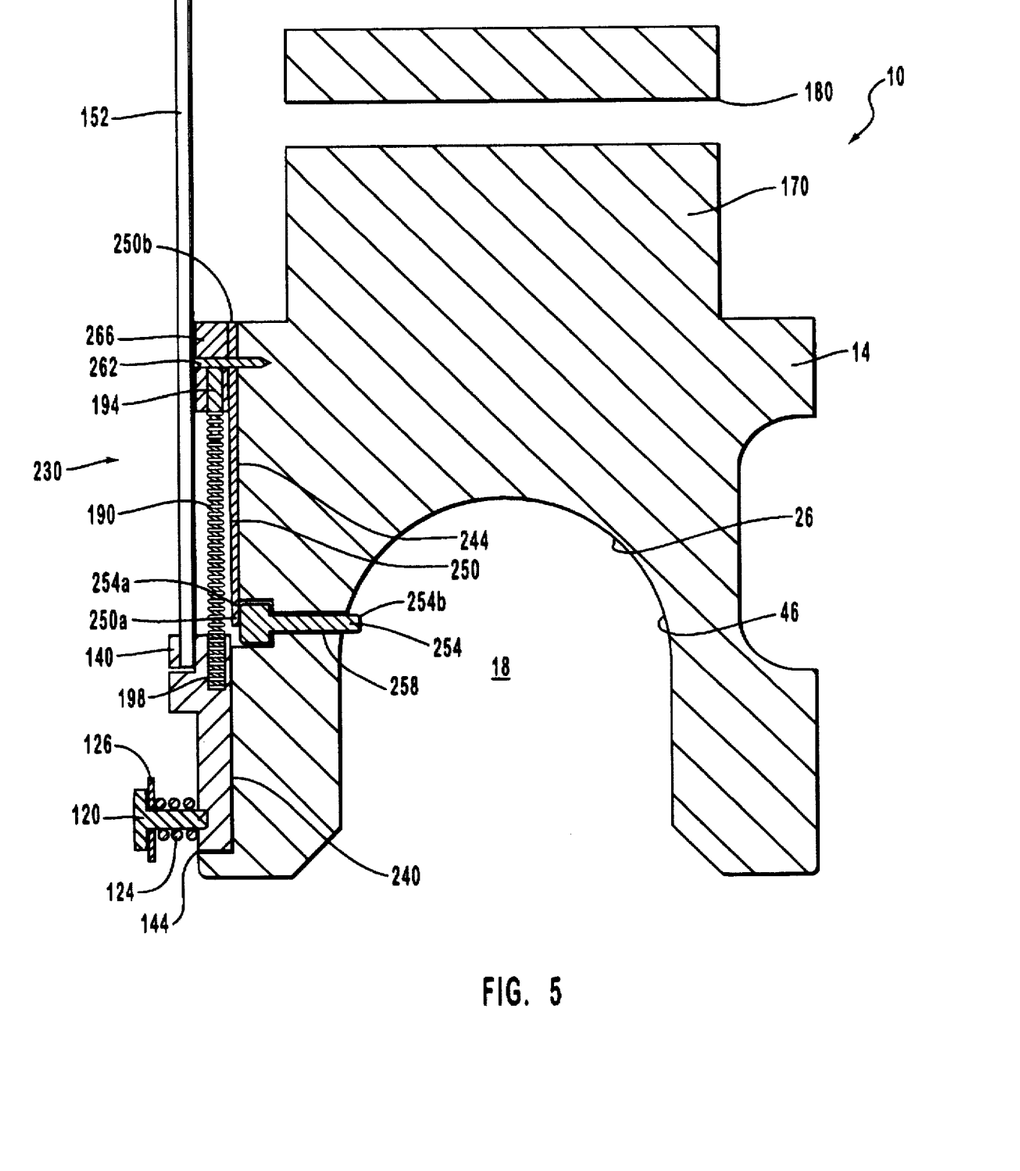
FIG. 5 shows a side, cross-sectional view of the housing with an alternate embodiment of the actuator, the actuator being positioned in the closed position.

The slidable locking bar groove 144 includes a locking step 148 or analogous device which is discussed in detail with respect to FIGS. 4 and 5. The locking step 148 is used to prevent the slidable locking bar 140 from being accidentally moved so as to open the rotatable rods. To overcome the locking step 148, specific movements must be made with the slidable locking bar 140 which would be unlikely to occur through accident.

The sliding lock bar 140 is moved upwardly by applying force to a control cable 152 which is attached to the slidable locking bar by a set screw 156 or some other convenient attachment. The control cable 152 is typically held in place by an eyelet 160 disposed several inches above the sliding lock bar 140. When the upward pressure on the control cable 152 is released, the slidable locking bar 140 is forced downwardly in the slidable locking bar groove 144 by a compression spring (FIG. 3B).

Also shown in FIG. 3A is the housing 14 with a modified upper housing section 170. Instead of extending upwardly slightly so that it may be welded to the pipe 60 of the goose neck trailer, the upper housing section 170 is elongated for nesting deeper within the opening 64 in the pipe. A hole (not show) is formed in both the upper housing section 170 and the pipe 60 for receiving a removable pin 174. The pin 174 holds the upper housing section 170 firmly within the pipe 60, but allows the upper housing section to be withdrawn or replaced when ever desired.

Those familiar with goose neck trailers and the like will appreciate that removal of the coupler 10 from the pipe 60 will significantly reduce the risk of theft when the trailer is parked for an extended period of time. It is common place for thieves to simply attach goose neck or similar trailers to their trucks and drive away in the middle of the night. With the removable coupler 10 shown in FIG. 3A, the housing 14 can be removed, thereby greatly decreasing the ability of a potential thief to drive off with the trailer due to the lack of an attachment mechanism. To further discourage theft, the size of the holes and other characteristics can be customized.

When the user needs the trailer, the coupler 10 shown in FIG. 3A can be reinstalled by inserting the upper housing section 170 into the pipe 60 and inserting the pin 174. To provide additional strength to the pipe 60, an annular band 178 will typically be placed there around adjacent the coupling with the main portion of the housing 14.

Referring now to FIG. 3B, there is shown a perspective view of the ball-type coupler 10, including the housing 14 with the extended upper housing section 170 with a hole 180 formed therein for receiving the pin 174 (FIG. 3A) used to hold the housing 14 to the pipe 60 (FIGS. 1 and 3A) of the goose neck or other trailer.

FIG. 3B also shows the actuator means 100 disposed in a locking state (second position) such that a ball disposed in the void 18 (FIGS. 1 and 2) is held therein. In such a position, the slotted control arms 104 are disposed so as to slope slightly downwardly as they extend along the shoulder bolt 120 and toward each other. As the slotted control arms 104 move from the position shown in FIG. 3A, wherein the shoulder bolt 120 is disposed adjacent the second end 134 of the slot 128 of each arm, and the position of FIG. 3B, wherein the shoulder bolt is disposed toward the first end 132 of the slot of each arm, the slotted control arms rotate between about 45 and 60 degrees. This causes a like rotation of the rotatable rods 38 which are disposed within the housing 14. This, in turn, moves the rotatable rods 38 from the first, open position shown by rod 38a (FIGS. 1 and 2), to the second, closed position shown by rod 38b. Once the rods 38 are disposed in the second, closed position, a ball disposed within the void may not be withdrawn.

Referring momentarily to FIGS. 1, 3A and 3B, it will become apparent to those skilled in the art that such an arrangement provides several significant advantages over the coupling mechanisms of the prior art. First, the rods 38 are much less likely to fail under pressure than the prior art. Instead of having a cam or latch which can be forced outwardly, the rotatable rods 38 rotate about their central or longitudinal axis. Thus, the only way to force them open would be to deform the rods 38. However, because the rods 38 are typically made of steel, the risk of deformation is small. Additionally, the rods 38 are held within a steel housing 14 and the majority of each rod remains in the housing even when in the second, closed position. Thus, the housing would also typically have to be deformed to allow the ball to be removed when the actuator means is in a locking position.

Additionally, unlike the prior art, a strong downward pressure on the ball only increases the ability of the rods 38 to hold the ball. A strong downward pressure may cause a slight inward rotation (i.e. the upper portion of the rods 38 rotating toward the void 18 in FIG. 1). Such a rotation forces the rods to remain in the second, closed position forces the actuator means 100 more firmly into the closed position shown in FIG. 3B.

If the actuator means 100 were to break for some reason, the downward pressure of ball would have a tendency to increase friction between the rotatable rods 38 and the channels 80 in which they are disposed. The increased friction will tend to keep the rods 38 in the second, closed position. Furthermore, one of the rotatable rods 38 can even be removed, and the remaining rod will hold the ball in place, so long as the ball is the appropriate size for the void 18 of the housing 14. In contrast, the mechanisms of the prior art will generally allow the ball to be withdrawn from the void if their locking mechanism fail.

Another advantage of the present invention is that it serves as a safety, in that the coupler 10 automatically locks the ball in place. Thus, there is no risk that an inadvertent user will forget to activate the actuator mechanism and will drive off with an unsecured trailer. With the present invention, the ball is automatically locked within the housing 14.

The actuator means 100 (FIG. 3B) is biased in a closed position by a compression spring 190 and is also pulled down by gravity. The spring 190 is mounted on one end on a roll pin 194 which is inserted into the housing in a conventional manner. The opposing end of the spring 190 is inserted in a channel in the slidable locking bar 140 (shown in FIG. 4). Unless the force is applied to cable 150 in an upward direction, the slidable locking bar 140 automatically by the spring 190 moved in the slidable locking bar groove 144 and returned to the position shown in FIG. 3B. In such a position, the slotted control arms 104 are disposed so that the rotatable rods 38 are positioned in the second, closed position shown at 38b in FIGS. 1 and 2. When the slidable locking bar 140 is moved up into the open position, the spring 190 and roll pin 194 nest inside the channel in the slidable locking bar.

Those skilled in the art will appreciate that the arrangement shown in FIGS. 3A and 3B, the slotted control arms 104 act as yet another safety. If the shoulder bolt 120 is removed from the actuator means 100 or 230, the force of gravity on the control arms 104 will pull then into a position in which they extend downwardly from the rotatable rods 38. When the control arms 104 are in such a position, the rotatable rods 38 are rotated into such a position that they extend into the void 18 and prevent the ball from being withdrawn. The curved portion 42 of the rods 38 will be even further from the first, open position than when the control arms 104 are properly positioned on the slidable locking bar 140.

Referring now to FIG. 4, there is shown a side, cross-sectional view of the housing 14 of the ball-type coupler 10 of the present invention. The inner wall 46 of the housing 14 defines the void 18 which receives the ball (not shown). The housing also includes the upper housing section 170 which has a hole 180 formed therein for receiving a pin. The pipe 60 also includes a hole 62 which is aligned with the hole 180 in the upper housing section 170. Other portions of the coupler 10 are labeled with like references to those used in prior figures.

FIG. 4 also shows a side, cross-sectional view of the actuator means 100. As has been previously discussed, the actuator means 100 includes the slidable locking bar 140 which moves vertically within the slidable locking bar groove 144. The slidable locking bar groove 144 has a first, lower portion 210, and a second, upper portion 214. The slidable locking bar 140 is biased into the first, lower portion 210 (which corresponds to the second, closed position of the slidable locking bar). The slidable locking bar 140 and may freely move into the first, lower portion. However, the ability of the slidable locking bar 140 to move upwardly in the slidable locking bar groove 144 into the second, upper portion is limited. Specifically, the slidable locking bar groove 144 has a safety mechanism formed therein. The safety mechanism can be, for example, the step 148 which is disposed in the slidable locking bar groove 144 such that the first, lower portion 210 is deeper than the second, upper portion 214.

The step 218 prevents the slidable locking bar 140 from being moved if the cable 152 is pulled vertically. To move the slidable locking bar 140 into the second, upper portion 214 of the slidable locking bar groove 144, the slidable locking bar must be pulled at such an angle to overcome the step 148. This is typically accomplished by pulling on the cable 152 in the direction indicated by arrow 222. Upward force on the cable 152 then moves the slidable locking bar 140 into the second, upper portion 214 of the slidable locking bar groove 144.

As the slidable locking bar 140 is pulled to overcome the step 148, the outward movement of the bar is limited by the overlapping slotted control arms 104 (FIGS. 2-3B) and the their interaction with the shoulder bolt 120. Thus, the slidable locking bar 140 cannot be pulled out of the slidable locking bar groove 144 unless the shoulder bolt 120 is removed from the bar.

Once the slidable locking bar 140 has been pulled around the step 148, it may be moved upwardly so that the spring 190 and the roll pin 194 nest within the channel 198 formed in the locking bar. Once the slidable locking bar 140 has been pulled so that it will pass beyond the step 148, placing the housing 14 on a ball will typically lock the coupler 10 about the ball. This is due to that fact that the weight of the trailer will apply a downward force on the housing. If the slidable locking bar 140 is not locked or nested within the first lower portion 210 of the sliding bar groove 144, the weight of the trailer will force the rotatable rods 38 from the second, closed position (shown in FIGS. 1 and 2 at 38b) in which they are biased by the actuator means 100, to the first, open position (shown in FIGS. 1 and 2 at 38a) as the ball slides into the void 18. As soon as the lower curvature 34 of the ball 22 (FIG. 1) slides past the rotatable rods 38, the compression spring 190 of the actuator means 100 forces the rods back into the second, closed position. Thus, the coupler 10 automatically locks the ball in place. To remove the ball 22, the slidable locking bar 140 of the actuator means 100 must be moved into the second, upper portion 214, such as by pulling the cable 152 outwardly and then upwardly. Those skilled in the art will appreciate that there a numerous other methods in which the actuator means could be actuated to rotated the rotatable rods between the second, closed position and the first, open position.

Referring now to FIG. 5, there is shown a cross-sectional view similar to that shown in FIG. 4, but of an alternate embodiment of the actuator means. To highlight the differences between the actuator means, generally indicated at 230, shown in FIG. 5, from the actuator means 100 of FIG. 4, the numbers of all similar parts of the housing 14 and the respective actuator means have been given the same number. Thus, any structures having a different number than that discussed regarding FIG. 4 have been modified.

As with the embodiment discussed in FIG. 4, slidable locking bar groove 144 has a first lower portion 240 and a second, upper portion 244. Unlike the embodiment discussed in FIG. 4, however, the first lower portion 240 is not deeper than the second, upper portion 244. To the contrary, the second upper portion 244 has a groove which extends deeper than the first, lower portion. The groove in the second upper portion 244 is used to house a biasing/locking arm 250.

The biasing/locking arm 250 is disposed adjacent to a shoulder dowel 254. The shoulder dowel 254 extends from a first end which floats in a counter bore or hole 258 adjacent the biasing/locking arm 250. Alternatively, the shoulder dowel 254 could be attached to the biasing/locking arm 250. A second end 254b which extends into the void of the housing 14 and is moveable with respect to the bore.

In the position shown, the dowel 254 and the biasing/locking arm 250 do not interfere with movement of the slidable locking bar 140 within the slidable locking bar groove 144. Thus, for example, if the ball were slid into the void 18 of the housing 14, the ball would cause the rotatable rods 38 (FIGS. 1-3B) to deflect out of the way of the ball without requiring the slidable locking bar 140 to be pulled outwardly to overcome the step 148 of the embodiment shown in FIG. 4. Thus, simply placing the void 18 of the housing 14 above the ball and applying a downward pressure (such as the weight of the tongue of the trailer) will cause the ball to enter the housing.

Once the ball is slid into the void 18 of the housing 14, the ball displaces the dowel 254 by pushing the dowel into the hole 258. This, in turn, displaces the biasing/locking arm 250 so that a bottom end 250a extends outwardly. Thus, the bottom end 250a of the biasing/locking arm 250 forms a step (not shown) in the slidable locking bar groove 144 after the ball has been inserted into the void 18.

To minimize wear on the ball, it is recommended that the biasing/locking arm 250 be relatively flexible. If the biasing/ locking arm 250 is too flex resistant, it will tend to drive the dowel 254 into continual, forceful contact with the ball. Over time, this will have a tendency to mar the exterior of the ball and render the ball unsightly. When a flexible, springy material is used for the biasing/locking arm 250, the dowel 254 is only lightly pressed against the ball and does not cause damage.

Of course, the biasing/locking arm 250 must not be so flexible that it can be bent out of the way by upward movement of the locking arm. It is anticipated that an ideal biasing/locking arm 250 will be between about ¼ and ¾ inches wide, 1/32 and 1/8 inches thick, and be formed of a spring steel.

The upper end 250b of the biasing/locking arm 250 is held in place by a set screw 262 and a retainer 266 which is connected thereto. The retainer 266 will typically also include a roll pin 194 disposed in a lower end for receiving the top end of the compression spring 190. The compression spring 190 maintains the slidable locking bar 140 in the first, lower end 240 of the slidable locking bar groove 144, unless the cable 152 is pulled upwardly when the ball is not present in the void 18, or outwardly and upwardly when a ball is present in the void. Of course, sliding the ball into the void 18 without pulling on the cable 152 will cause a momentary upward movement of the slidable locking bar.

In light of the disclosure regarding FIGS. 4 and 5, those skilled in the art will recognize numerous different modifications which can be made to the actuator means. Such modifications will likely also include the ability of the user to mount the housing 14 about the ball in the back of a truck without requiring the user to get onto the truck bed, and without requiring the user to take an affirmative act to secure the ball within the void 18 of the housing.

Figure 6:
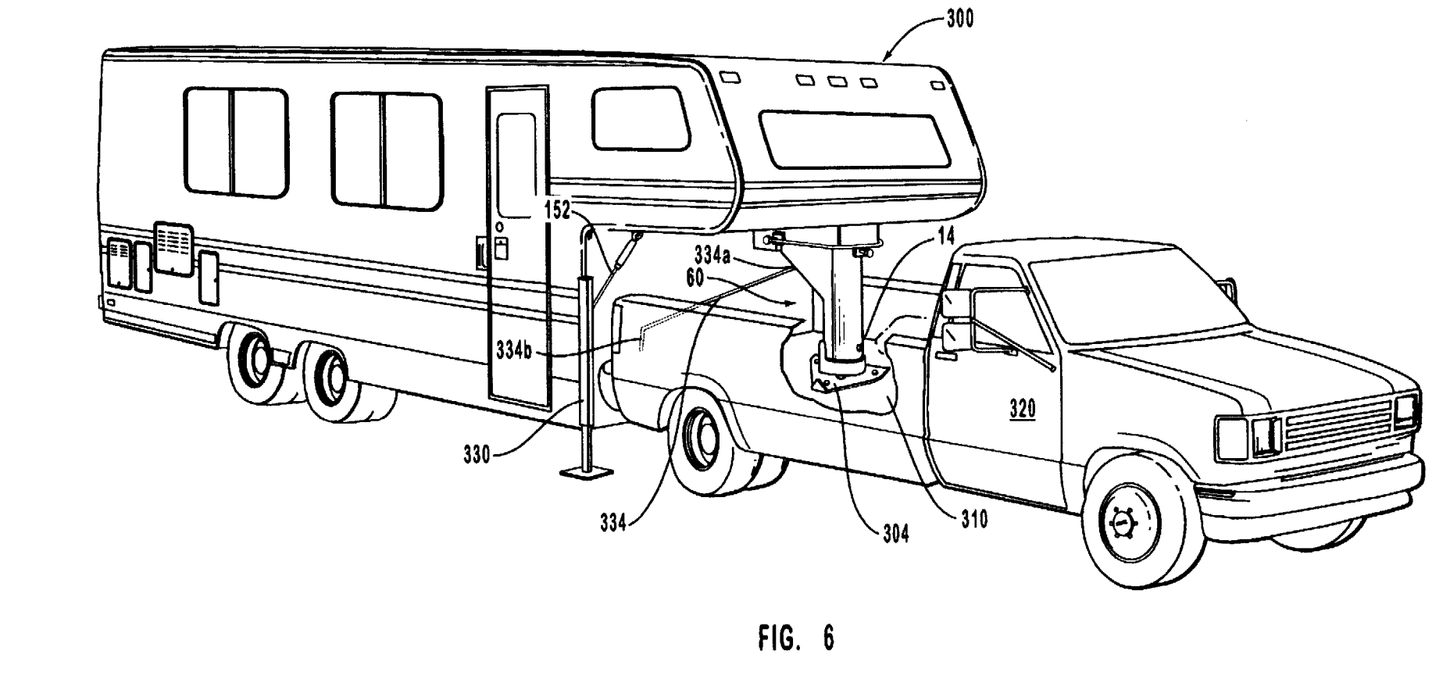
FIG. 6 shows a side view of the present invention being used to attach a goose neck trailer to a ball positioned on the bed of a truck.

Referring now to FIG. 6, there is shown a perspective view of a trailer, generally indicated at 300, attached to a ball supporting plate 304. The housing 14 is disposed at a lower end of the pipe 60 which extends generally downwardly from the trailer 300. As shown in FIG. 6, the housing 14 is disposed about the ball and is in a locking position. As the procedure for sliding the ball into housing 14 has been discussed in detail with respect to the different embodiments of the housing, the steps of the process will not be repeated.

Once the trailer is no longer needed, the housing 14 must be uncoupled from the ball and the truck 320 driven away from the trailer 300. To support the trailer 300, a jack 330 (either electric or manual) is typically provided. With prior art devices, however, it was often required to release the locking mechanism on the ball prior to use of the jack. While this typically is not troublesome, there are several scenarios, where is desirable to deploy the jack 330 as the housing is uncoupled from the ball. For example, if the trailer 300 must be unattached while on a slight hill, it is best to have the jack 300 deploy as the trailer is uncoupled.

As is shown in FIG. 6, the present invention enables a single user to release the hold of the housing 14 on the ball, while simultaneously deploying the jack 330. An extension handle 334 is provided with a hook and a first end 334a and a grasping handle 334b disposed at an opposing end. To enable removal of the ball in the housing 14, the actuator means 100 (FIG. 4) or 230 (FIG. 5) must be pulled outwardly and upwardly to overcome the step 218 or the biasing/locking arm 250, respectively. While shown in FIG. 6 on a slanted portion of the cable 152, the handle is used on a vertical portion (such as is shown at arrow 222 in FIG. 4) which has an eyelet disposed at a top thereof to prevent the slanted portion from causing the slidable locking bar 140 (FIGS. 4 and 5) to be moved outwardly.

Once the step 148 (FIG. 4) or biasing/locking arm 250 (FIG. 5) is overcome, the cable 152 need only be pulled and the rotatable rods 38 (FIGS. 1-3B) will be rotated into a position in which they do not interfere with movement of the ball. By having the cable 152 extend to a position adjacent the jack 330, the user can simultaneously open the housing 14 and lift the front end of the trailer 300 with the jack. The truck 320 may then be driven away. If the housing 14 is held to the pipe 60 by a pin 174, the pin can be removed and the housing 14 removed from the pipe 60, thereby decreasing the risk that the trailer will be stolen.

During both the attachment and removal of the housing to the ball, the user is able to control the entire process without climbing onto the truck. Additionally, the automatic closing features of the rotatable rods 38 and the actuator means 100 or 230, enable the user to know that whenever the housing 14 is disposed on the ball, the ball is locked within the housing unless someone is pulling on the cable 152. Additionally, because the slidable locking bar 140 must be first moved outwardly and then upwardly for the housing 14 to release the ball, an accidental pull of the cable 152 will not permit the ball to be released.

Thus, there is disclosed an improved ball-type coupler for goose neck and other trailers. The coupler allows for multidirectional hook-up, improved convenience and an automatic closure system which increases safety. Those skilled in the art will recognize numerous modifications which can be made without departing from the scope and spirit of the invention. The appended claims are intended to cover such modifications.

What is claimed is:

1. A ball-type coupler for holding trailers and the like to a ball mounted on a vehicle, the coupler comprising:

housing means having a void defined therein for receiving the ball, a diameter of the void being slightly larger than the ball, the housing having a first channel disposed so as to communicate with the void, and a second channel disposed on an opposite side of the void, the second channel also communicating with the void;

one rod disposed in the first channel and another rod disposed in the second channel, each rod having a noncylindrical section disposed adjacent the void, the rods having a central axis of rotation and being rotatable thereabout between (i) a first position wherein the noncylindrical section of the rods extend into the void a sufficient distance to prevent the ball sliding within the void past the rotatable rods, and (ii) a second position wherein the noncylindrical section of the rods do not extend into the void sufficiently to prevent the ball from passing the rods; and actuator means disposed in communication with the rods for rotating the rods between the first position and the second position.

2. The coupler of claim 1, wherein the housing further comprises retention means disposed adjacent the first and second channels for holding the rods in the respective channels.

3. The coupler of claim 2, wherein the retention means comprises a pair roll pins disposed so that each roll pin intersects one of the channels.

4. The coupler of claim 3, wherein each rod includes a groove formed therein, each roll pins being nestable in said groove so as to prevent the rod from being withdrawn from the channel when the roll pin is nested within the groove.

5. A ball-type coupler for holding trailers and the like to a ball mounted on a vehicle, the coupler comprising:

housing means having a void defined therein for receiving the ball, a diameter of the void being slightly larger than the ball;

at least one rod disposed within the housing and having a noncylindrical section and exterior surface which intersects the void, the rod having a central axis of rotation and being rotatable thereabout between (i) a first position wherein the noncylindrical exterior surface of the rod extends into the void a sufficient distance to prevent the ball sliding within the void past the rotatable rod, and (ii) a second position wherein the noncylindrical exterior surface of the rod does not extend into the void sufficiently to prevent the ball from passing the rod; and a sliding member and a control arm attached to the at least one rod and to the sliding member such that movement of the sliding member in a generally linear direction causes rotational movement of the at least one rod for rotating the rod between the first position and the second position.

6. The coupler of claim 5, wherein the coupler comprises two rotatable rods disposed on opposite sides of the void of the housing, and wherein a control arm has first and second ends, the first ends of each control arm being attached to a respective rod, and the second ends being attached to the sliding member, such that generally linear movement of the sliding member causes rotational movement in each arm.

7. The coupler of claim 6, wherein the actuator means further comprises a groove formed vertically in the housing and having a first lower end and a second, upper end, the sliding member being disposed in said groove and slidable between the second upper end and the first, lower end to thereby to rotate the rods between the first position and the second position.

8. The coupler of claim 7, wherein the slidable member has:

a first position wherein the rods to which the slidable member is connected by the control arms are in the first position so as to limit movement of a ball disposed within the void; and a second position, wherein the rods to which the slidable member is attached by the control arms are in a second position wherein the rods do not limit movement of the ball; and wherein the actuator means further comprises biasing means for keeping the slidable member in the first position.

9. The coupler of claim 8, wherein the actuator means further comprises locking means for limiting movement of the slidable member from the first position to the second position.

10. The coupler of claim 9, wherein the locking means comprises a step formed in the groove between the first, lower portion and the second, upper portion.

11. The coupler of claim 10, wherein the actuator means further comprises means for moving the slidable member toward the biasing member and over the step, to thereby move the slidable member passed the step, and from the first position to the second position.

12. The coupler of claim 9, wherein the locking means comprises:

a biasing arm disposed in the groove, the biasing arm having an unattached lower end extendable into the groove; and a dowel extending through the housing into the void, the dowel being movable such that placement of a ball within the void of the housing forces the dowel and the unattached lower end of the biasing arm outwardly from the void, the dowel forcing the unattached lower end of the biasing arm outwardly into the groove to limit movement of the slidable member within the groove.

13. The coupler of claim 12, wherein the actuator means further comprises means for moving the slidable member toward the biasing member and over the lower end of the biasing arm, to thereby move the slidable member passed the step, and from the first position to the second position.

14. The coupler of claim 5, wherein the housing comprises attachment means for connecting the housing to a pipe attached to a trailer, the connecting means comprising an upper housing section for nesting within the pipe.

15. The coupler of claim 14, wherein the attachment means comprises a pin for selectively holding the upper housing section within the pipe, the pin being removable so as to enable the upper section of the housing to be withdrawn from the pipe.

16. The coupler of claim 5, wherein the control arm is releasably attached to the slidable member, so as to enable removal of the control arm and the rotatable member from the housing.

17. A ball-type coupler for holding trailers and the like to a ball mounted on a vehicle, the coupler comprising:

housing means having a void defined therein for receiving the ball, a diameter of the void being slightly larger than the ball;

at least one rotatable member disposed at least partially within the housing, the rotatable member having a first position wherein the rotatable member extends into the void a sufficient distance to prevent the ball sliding within the void past the rotatable member; and a second position wherein the rotatable member does not extend into the void sufficiently to prevent the ball from passing the rotatable member; and actuator means disposed in communication with the at least one rotatable member for rotating the rotatable member between the first position and the second position, the actuator means comprising a control arm and a slidable member slidable in a linear direction, the control arm having a first end attached to the rotatable member and a second end attached to the slidable member, such that sliding the slidable member in a linear direction moves the control arm and rotates the rotatable member.

18. The ball-type coupler of claim 17, wherein the housing comprises an elongate groove formed therein for holding the slidable member, and wherein the elongate groove includes means for limiting the movement of the slidable member in the linear direction.

19. The ball-type coupler of claim 18, wherein the means for limiting the movement of the slidable member includes a step formed in the elongate groove.

20. The ball-type coupler of claim 18, wherein the means for limiting movement of the slidable member includes a biasing member disposed in the groove.

21. The ball-type coupler of claim 20, wherein the biasing member comprises a compression spring.

22. The ball-type coupler of claim 20, wherein the biasing member comprises a flexible arm having an unattached end extendable outwardly into the groove to thereby limit movement of the slidable member.

23. The ball-type coupler of claim 22, wherein the means for limiting movement of the slidable member further comprises a dowel attached to the flexible arm adjacent the unattached end, and extending into the void of the housing such that positioning a ball within the void of the housing forces the dowel and the unattached end of the flexible arm outwardly from the housing.

24. The ball-type coupler of claim 17, wherein the rotatable member comprises an elongate rod disposed within the housing and having a noncylindrical section and exterior surface which intersects the void, the rod having a central axis of rotation and being rotatable thereabout between (i) a first position wherein the noncylindrical exterior surface of the rod extends into the void a sufficient distance to prevent the ball sliding within the void past the rotatable rod, and (ii) a second position wherein the noncylindrical exterior surface of the rod does not extend into the void sufficiently to prevent the ball from passing the rod.

* * * * *